May 21, 1968 F. S. SILLARS 3,384,286
SOLDER APPLICATORS
Filed Oct. 20, 1965 3 Sheets-Sheet 1
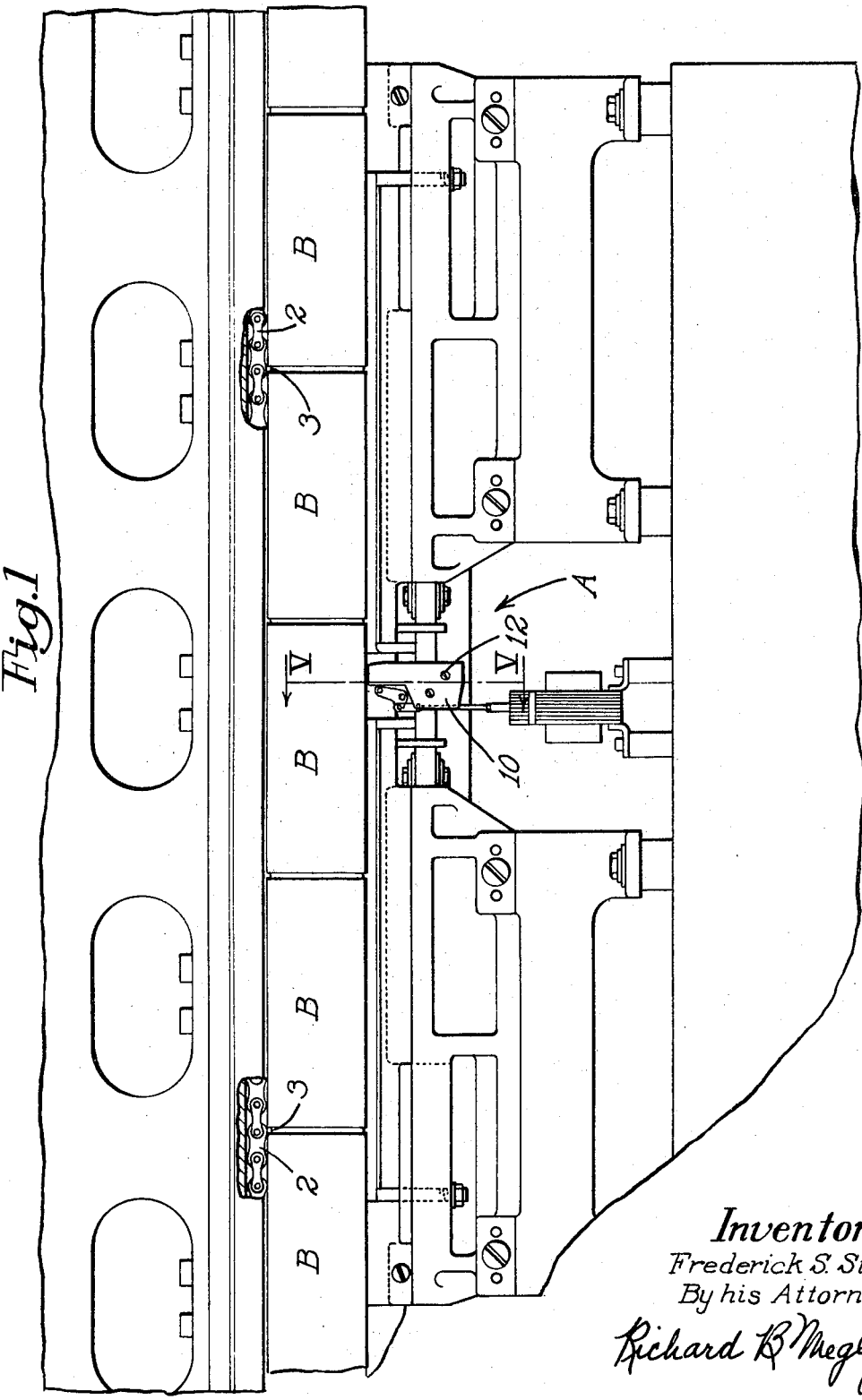
Inventor
Frederick S. Sillars
By his Attorney
Richard B. Megley May 21, 1968      F. S. SILLARS      3,384,286
SOLDER APPLICATORS
Filed Oct. 20, 1965      3 Sheets-Sheet 2
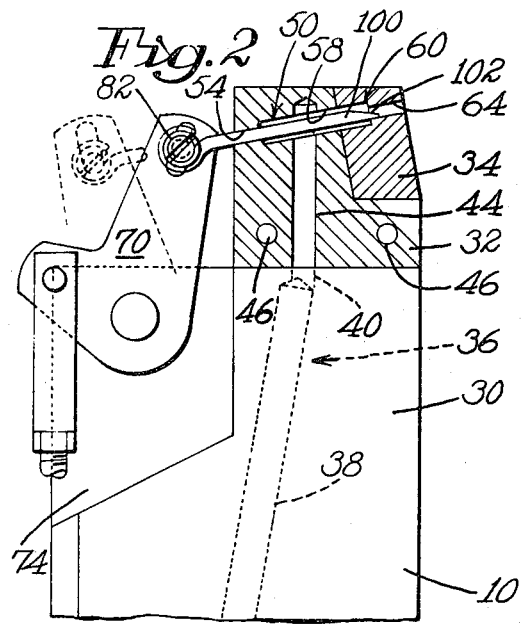
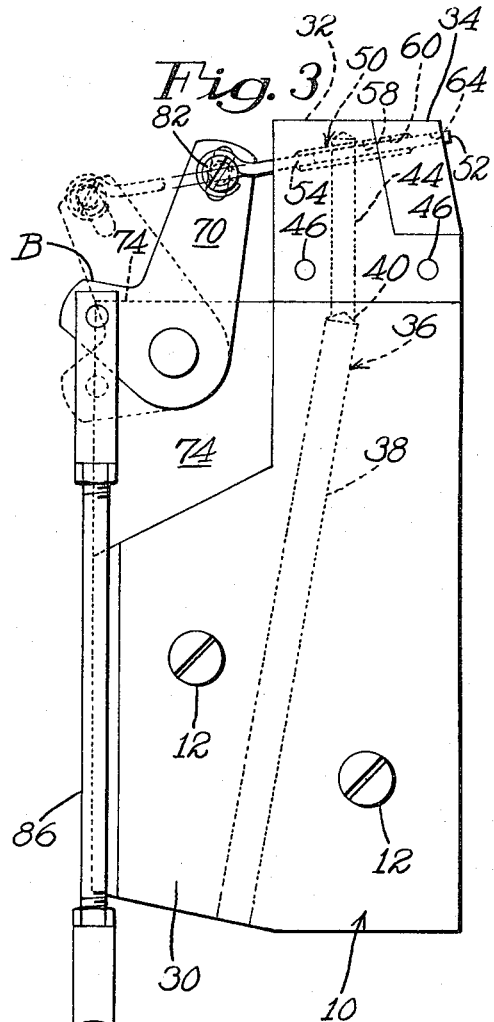
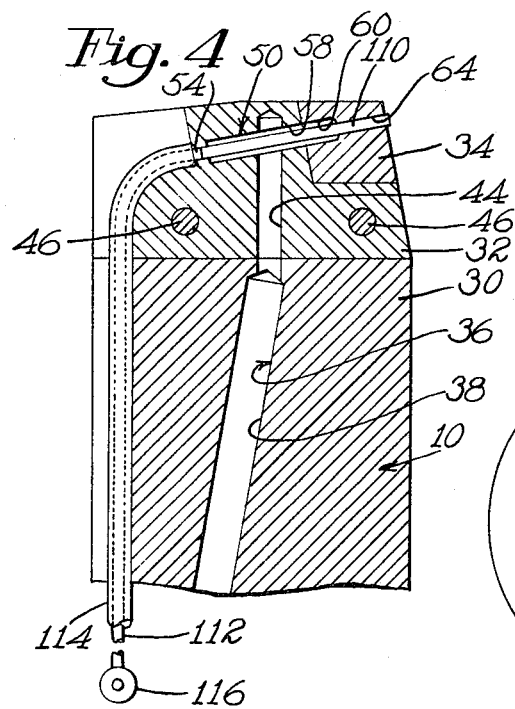
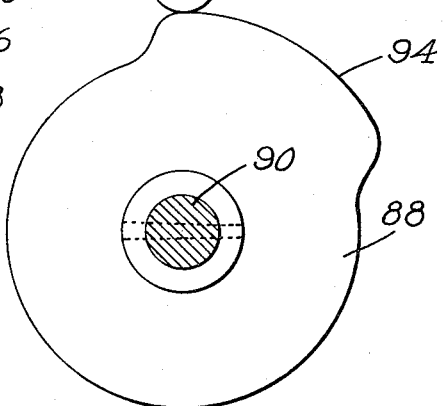

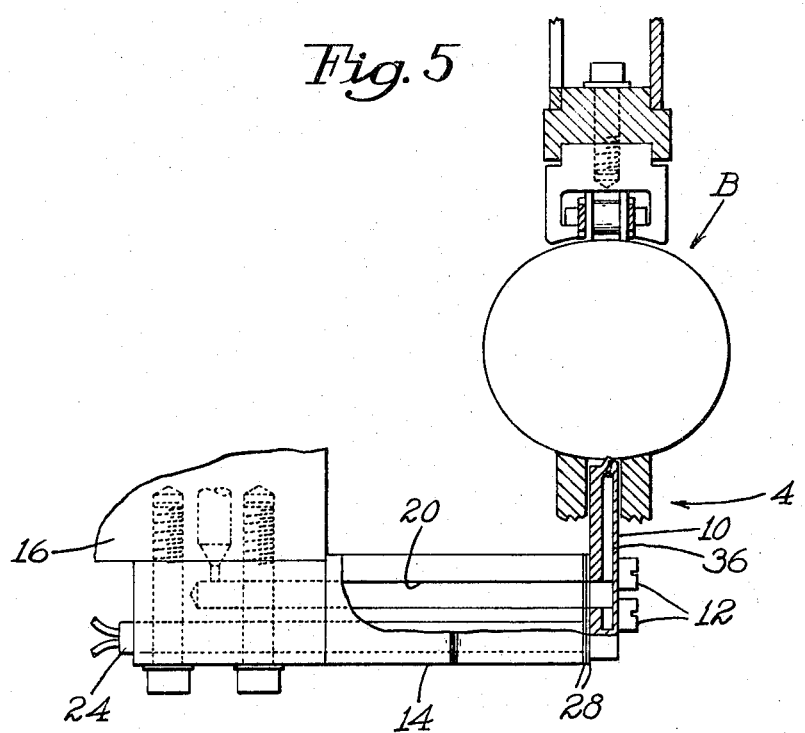

United States Patent Office 3,384,286
Patented May 21, 1968

3,384,286
SOLDER APPLICATORS
Frederick S. Sillars, Beverly, Mass., assignor to United Shoe Machinery Corporation, Flemington, N.J., and Boston, Mass., a corporation of New Jersey
Filed Oct. 20, 1965, Ser. No. 498,481
4 Claims. (Cl. 228—11)

ABSTRACT OF THE DISCLOSURE

Apparatus for controlling the flow of solder in a can body side seam soldering machine through which bodies are moved by a plurality of feed dogs each engageable with the trailing edge of a can body. For directing a stream of solder into the side seam of the can bodies a nozzle having probing means is provided for intermittently interrupting the flow of solder from the nozzle each time a feed dog is in position above the nozzle.

---

This invention relates to apparatus for soldering can bodies and, more particularly, to an improved applicator or nozzle for applying solder to the side seams of "tin" cans. The conventional method of forming a "tin" can is to bend a sheet of metal into a tube and interlock its edges to form a side seam or longitudinal seam joint of interlocked layers. It is to these layers that solder must be applied to seal the side seam. Apparatus including an applicator or nozzle for applying solder to a can formed in the manner just described is disclosed in applicant's United States Patent No. 3,190,528, issued June 22, 1965. The present invention relates to an improved applicator or nozzle of the type delineated in said patent in which means are provided for insuring the continuous flow of solder from the applicator.

Solder applicators of the type disclosed in the referenced patent generally comprise a rigid body having a passageway through which solder is fed from a solder pot to a discharge orifice. Solder is projected from the applicator at the discharge orifice into the side seam of a can body passing thereabove. The trajectory at which the solder is projected or discharged from the applicator is a function of the pressure applied by the molten solder in the solder pot and the diameter, length and configuration of the passageway.

The solder pot normally has adjusting means associated therewith for controlling the height of molten solder in the pot and, therefore, the pressure applied to the solder in the passageway. Means are also generally provided for continuously feeding bars of solder into the pot whereby the pressure head of the molten solder at the applicator is maintained essentially constant.

In the operation of soldering machines of this type, slag is formed in the solder pot during the melting of the bars of solder. Additionally, a certain amount of foreign material is unavoidably introduced into the solder pot and, consequently, into the passageway during extended usage of these machines. Accordingly, a common problem encountered in the use of side seam soldering machines of this type is the blockage or restriction of the passageway through which the solder is fed by slag and other foreign material. If the passageway is totally blocked, the machine is totally inoperative. If the passageway is restricted, the trajectory of the discharged solder will be altered with the result that the solder is not applied properly.

Accordingly, it is an object of this invention to provide a solder applicator having means for removing obstructions formed in the passageway thereof during the operation of the machine.

As discussed in the referenced patent, can bodies to be soldered are conveyed past the soldering station by an endless chain having feed dogs thereon located at predetermined spaced intervals. Each dog is engageable with the trailing edge of one can body, the spaces between adjacent bodies being equal to the length of the dogs. While it is acceptable under certain conditions to have a small amount of solder deposited on the inner surface of a can body, where the cans are to be used for foods and the like it is a requirement that solder not be permitted to pass through the gaps between can bodies to collect as loosely attached beads on their inner surfaces. In the machine of the referenced patent, this problem is solved by designing the passageway and orifice of the applicator such that the solder is discharged with the horizontal component of velocity approximately the same magnitude as the velocity of the cans whereby solder passing through the gaps would not be scooped up by the can bodies. If the horizontal component of velocity of the solder is substantially greater than the velocity of the cans and the solder is directed high enough it will squirt through the gaps and collect on the inside of the can bodies which have just passed the applicator. Likewise, if the horizontal component of velocity of the solder is substantially less than the velocity of the cans and the solder is directed high enough it will squirt through the gaps and be scooped up by the leading edges of the can bodies as they pass over the applicator. Thus, unless the discharge velocity is maintained within a relatively limited tolerance in the machine of the referenced patent, unwanted solder may be deposited on the inside of the can bodies. The velocity is effected by the solder head, the size of the passageway, and the discharge trajectory. Accordingly, the lowering or raising of the solder head and the entrapment of slag or other foreign material within the passageway can result in solder being discharged at a velocity outside the tolerable range whereby solder is deposited on the inside of can bodies exposed to the applicator.

Accordingly, it is a further object of this invention to provide a solder applicator having means for intermittently interrupting the discharge of solder at intervals correlated to the spacing of the gaps between can bodies.

Applicators previously used in machines of the type disclosed in the referenced patent do not permit the adjustment of the rate of solder flow or the discharge velocity. That is, other than by adjustment of the solder head. Thus, approximately the same amount of solder is applied regardless of the size of the side seam. Additionally, the trajectory and velocity remained constant regardless of the displacement of the discharge orifice from the side seams to be soldered.

It is a further object of this invention to provide a solder applicator having means for regulating the rate of solder discharged therefrom.

To these ends and in accordance with a feature of this invention, there is provided an applicator, or nozzle for applying solder to the side seams of moving can bodies comprising a rigid body having a solder discharge passageway and means for probing said discharge passageway to remove foreign matter therefrom comprising an elongated probing member slidingly mounted in said nozzle for translation in said discharge passageway, means for translating said probing member within said discharge passageway, and means for actuating said translating means periodically to effect translation of said probing means.

There is also provided as a feature of this invention means for positioning said probing member in location to prevent the discharge of solder during the period required for each of the gaps between can bodies to pass over the nozzle.

Means for controlling the flow of solder are also provided as a further feature of this invention.

The above and other features of the invention including various novel details of construction and combinations of parts will now be more particularly described with reference to the accompanying drawings and pointed out in the claims. It will be understood that the particular embodiments of the invention are shown by way of illustration only and not as limitations of the invention. The principles and features of this invention may be employed in varied and numerous embodiments without departing from the scope of the invention.

In the drawings,

FIG. 1 is a side elevation of a can body soldering machine embodying the invention;

FIG. 2 is a side elevation on enlarged scale of a solder applicator embodying the invention and showing cam means associated therewith;

FIG. 3 is a side elevation on an enlarged scale, partly in section, of another embodiment of the applicator of this invention;

FIG. 4 is a sectional view in side elevation, on an enlarged scale, of still another embodiment of the applicator of this invention; and FIG. 5 is a sectional view on enlarged scale taken on the line V—V of FIG. 1 with the probing mechanisms removed.

FIG. 1 shows can bodies B which were formed in a bodymaker of any conventional type, not shown, being conveyed from left to right in a timed and spaced order by a machine having an endless chain 2 with feed dogs 3 located at predetermined spaced intervals. Each dog is engageable with the trailing edge of one can body, the spaces between adjacent bodies being equal to the length of the dogs. The can bodies B are conveyed past a soldering station 4 which forms the subject matter of this invention. The construction and location of parts is substantially as illustrated and described in my above referenced patent.

The soldering station 4 includes a non-yieldable, rigid body solder applicator or nozzle 10 which is secured by screws 12 to an arm 14 (FIG. 5) extending from the bottom of a solder reservoir 16 in a manner identical to that disclosed in the above referenced patent. The reservoir 16 includes adjusting means, not shown, for controlling the height of molten solder and means for continuously feeding bars of solder to the reservoir whereby the pressure of molten solder at the applicator 10 is maintained at a desired level. Solder flows from the reservoir 16 through the arm 14 in a horizontal passageway 20 which is maintained at a constant predetermined temperature by a resistance heated 24. As in the referenced patent, horizontal adjustment of the applicator 10 is obtained by the use of shims 28 between the applicator 10 and the mounting arm 14 therefor.

The solder applicator 10 (FIG. 3) has a rigid, three-part body of ceramic or metal comprising a base member 30, a mounting block 32 and a nozzle member 34. The base member 30 has an essentially vertical two diameter passageway 36 the lower or larger end 38 of which, as seen in FIG. 5, communicates with the passageway 20 in the arm 14. The upper or smaller end of the passageway 40 communicates with a complementary passageway 44 in the mounting block 32. The mounting block 32 is mounted on the base member 30 by pins 46, 46. The mounting block 32, (as distinguished from the nozzle member 34) has a two-diameter passageway 50 which intersects the passageway 44. A prober or blocking member 52 is slidingly supported in the smaller end 54 of the passageway 50, as hereinafter described in greater detail.

The larger end 58 of the passageway 50 communicates with a complementary passageway 60 in the nozzle member 34. The passageway 60 leads to a discharge passageway 64 of substantially the same diameter as the smaller end 54 of the passageway 50. The nozzle member 34 may be mounted on the mounting block in any convenient, conventional manner (not shown) resulting in the structure illustrated in FIG. 3 which is the preferred embodiment.

The prober 52 is mounted for sliding movement through the alined passageways 50, 60 and 64; movement being imparted by a bell crank lever 70. The lever 70 is pivotally mounted on a fin-like extension 74 of the base member 30. The prober 52 is secured to a bell crank lever 70 by a slot and screw arrangement 82 to which the end of the prober 52 is attached. The prober 52 is of substantially the same diameter as the passageway 64. Thus, pivotal movement of the bell crank lever 70 produces rectilinear movement of the prober 52 through the passageways 50 and 60 into the passageways 64 whereby to remove foreign matter and to prevent the discharge of solder from the passageway 64.

Pivotal movement is systematically imparted to the bell crank lever 70 in the preferred embodiment illustrated in FIG. 3 by an expandable connecting rod 86 affixed to and depending from the lever 70 and a cam 88 mounted on the main drive shaft 90 of the machine. The connecting rod 86 has a cam follower 92 rotatably mounted on the lower end thereof in position to engage the cam 88. The bell crank lever 70 is normally urged into a broken line position shown in FIG. 3. under the weight of the connecting rod 86. In the broken line position, the prober 52 is in a retracted position whereby molten solder can freely pass through the passageway 50 to the discharge passageway 64. When the cam follower 92 is engaged by a raised eccentric portion 94 of the cam 88, the lever 70 is pivoted clockwise into the solid line position shown in FIG. 3 wherein the prober 52 is moved through the passageways 50, 60 and 64 to remove foreign materials from the passageway 64. The eccentric portion 94 is of such a design and the cam 88 so located on the shaft 90 that it will engage the cam follower 92 each time the trailing edge of a can body is in position above the applicator. The cam follower rides off the eccentric portion 94 when the leading end of the succeeding can body is in position above the applicator. The flow of solder is thereby stopped during the interval when the gap between can bodies is in position above the applicator thereby avoiding the possibility that solder will be squirted between the gaps and accumulate on the inside of the can bodies.

An alternate embodiment of the prober is illustrated in FIG. 2. A prober 100 is mounted in the applicator as in the FIG. 3 embodiment. The end of the prober 100 disposed from the ball crank lever 70 is tapered. The taper may be of any design which will function in accordance with the following discussion. The tapered portion 102 may be employed to restrict the flow of molten solder through the discharge passageway 64. This is accomplished simply by locating the tapered portion 102 of the prober 100 at the desired position in the discharge passageway 64 to limit the flow of solder into the passageway 64 to the amount required as will be discussed below. Accordingly, the amount of solder deposited in the side seams of can bodies exposed to the applicator may be conveniently controlled. The prober 100 illustrated in FIG. 2 may be used to clear the passageways 60 and 64 in a manner similar to the prober 52. The stroke of the prober may be controlled by adjustment of the length of the expandable connecting rod 86 or by a change in design of the cam 88. If it is desired to limit the flow of molten solder in the manner discussed above, the stroke of the prober is adjusted such that tapered portion 102 of the prober 100 is located in the discharge passageway when the bell crank 70 is in the broken line position identified in FIG. 3.

A further embodiment is illustrated in FIG. 4. The prober 110 simply comprises the end of a flexible member 112 which is slidingly received in a tube 114. A follower cam 116 is mounted on one end of the member 112 and functions in a manner identical to the follower cam 92, as discussed above. However, in this particular embodiment, a closed track cam (not shown) is required to return the prober to a retracted position.

In the use of an applicator of the type discussed above, solder is introduced into the solder pot in the conventional manner. The solder flows through the passageways 36, 50 and 60 and is discharged into the side seams of can bodies through the discharge orifice 64. In the preferred embodiment illustrated in FIG. 3, the flow of solder is interrupted between can bodies by the blocking of the passageway 64 by the prober 52. Alternatively, the connecting arm 86 may be removed and the bell crank lever operated at any desired interval.

Having thus described my invention, what I claim as new and desire to secure by Letters Patent of the United States is:

1. In a machine for applying solder to the side seam of moving can bodies, said machine having feed means for moving the can bodies along a predetermined path of travel comprising a plurality of feed dogs each engageable with the trailing edge of a can body, a nozzle for directing a stream of solder into the side seam of each of said moving can bodies comprising a rigid body having a solder discharge passageway and means for intermittently interrupting the flow of solder each time a feed dog is in position above said nozzle comprising an elongated probing member slidingly mounted in said nozzle for translation in said discharge passageway, means for translating said probing member within said discharge passageway to remove foreign matter therefrom and to stop the flow of solder therethrough, and means for actuating said translating means each time a feed dog is in position above said nozzle.

2. In a machine for applying solder to the side seam of moving can bodies, said machine having feed means for moving the can bodies along a predetermined path of travel comprising a plurality of feed dogs each engageable with the trailing edge of a can body whereby gaps are created between successive can bodies, a nozzle for directing a stream of solder into the side seam of each of said moving can bodies comprising a rigid body having a solder discharge passageway and means for intermittently interrupting the flow of solder each time a gap between can bodies is in position above the nozzle comprising an elongated probing member slidingly mounted in said nozzle for translation in said discharge passageway, means for translating said probing member in said passageway to remove foreign matter therefrom and to stop the flow of solder therethrough, and means for motivating said translating means comprising a cam member mounted on the drive shaft and means linking said translating means and cam member.

3. In a machine for applying solder to the side seams of moving can bodies, a nozzle for directing a stream of solder into the side seams of each of said moving can bodies comprising a rigid body having a solder discharge passageway and means for controlling the flow of solder through said passageway comprising an elongated member having a tapered end portion slidingly mounted within said nozzle for translation in said discharge passageway and means for positioning said elongated member in said passabeway whereby to permit the location of said tapered end portion to restrict the passage of solder into said passageway.

4. In a machine for applying solder to the side seams of moving can bodies, a nozzle for directing solder into the side seam of each of said moving can bodies comprising a rigid body having a solder discharge passageway therein and means for controlling the flow of solder through said passageway and for probing said passageway to remove foreign matter comprising an elongated probing member having a tapered end portion slidingly mounted within said nozzle for translation in said discharge passageway, means for translating said probing member within said discharge passageway to remove obstructions therefrom, means for locating said probing member in a retracted position wherein the tapered end thereof restricts the passage of solder into said passageway to a predetermined amount, and means for motivating said translating means to periodically effect translation of said probing means.

References Cited

UNITED STATES PATENTS

| 1,669,846 | 5/1928 | Wenz et al. | 228—33 |
| 3,190,528 | 6/1965 | Sillars | 228—43 |

RICHARD H. EANES, Jr., *Primary Examiner.*